(12) United States Patent
Huang et al.

(10) Patent No.: US 11,303,587 B2
(45) Date of Patent: Apr. 12, 2022

(54) CHATBOT INFORMATION PROCESSING

(71) Applicant: International Business Machines Corporation, Armonk, NY (US)

(72) Inventors: Louis Huang, Taipei (TW); Chih-Yuan Lin, New Taipei (TW); Jin Shi, Ningbo (CN); Sharon Chen, New Taipei (TW); Pei-Yi Lin, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/423,993

(22) Filed: May 28, 2019

(65) Prior Publication Data
US 2020/0382447 A1 Dec. 3, 2020

(51) Int. Cl.
| | |
|---|---|
| *G06F 15/16* | (2006.01) |
| *H04L 51/02* | (2022.01) |
| *G06F 16/2452* | (2019.01) |
| *H04L 51/00* | (2022.01) |
| *G06F 16/28* | (2019.01) |
| *H04L 67/10* | (2022.01) |

(52) U.S. Cl.
CPC ........ *H04L 51/02* (2013.01); *G06F 16/24522* (2019.01); *G06F 16/289* (2019.01); *H04L 51/16* (2013.01); *H04L 67/10* (2013.01)

(58) Field of Classification Search
CPC ......... H04L 51/02; H04L 51/16; H04L 67/10; G06F 16/289; G06F 16/24522
USPC ....................................................... 709/206
See application file for complete search history.

(56) References Cited

U.S. PATENT DOCUMENTS

| | | | |
|---|---|---|---|
| 2011/0126119 A1* | 5/2011 | Young | G06F 3/048 715/744 |
| 2014/0122083 A1* | 5/2014 | Xiaojiang | H04L 51/02 704/270.1 |
| 2014/0279050 A1* | 9/2014 | Makar | G06Q 30/0269 705/14.66 |
| 2018/0082184 A1* | 3/2018 | Guo | G10L 15/22 |
| 2018/0212904 A1* | 7/2018 | Smullen | H04L 51/02 |
| 2018/0287968 A1 | 10/2018 | Koukoumidis et al. | |
| 2019/0180258 A1* | 6/2019 | Amar | G06F 3/0482 |

(Continued)

FOREIGN PATENT DOCUMENTS

WO 2016195912 A1 12/2016

OTHER PUBLICATIONS

Alenskaja, Marina, "Chatbot Design—A matter of user intent and conversation context", 6 pages, printed from <https://chatbotslife.com/chatbot-design-a-matter-of-user-intent-and-conversation-context-77e38c69779> on Oct. 6, 2018.

(Continued)

*Primary Examiner* — Cheikh T Ndiaye
*Assistant Examiner* — Ayele F Woldemariam
(74) *Attorney, Agent, or Firm* — Matthew J. Bussan

(57) ABSTRACT

A computer-implemented method, a computer system, and a computer program product are proposed. According to the method, chat information of a chatbot is obtained in response to receiving one or more chat messages from the chatbot. Then a matching data object of a matching data model from one or more data models is determined based on the chat information. And a data value of the matching data object is obtained as a response to the one or more chat messages.

14 Claims, 8 Drawing Sheets

(56) References Cited

U.S. PATENT DOCUMENTS

2019/0311036 A1* 10/2019 Shanmugam ........... H04L 51/02
2020/0099633 A1*  3/2020 D'Agostino ............ H04L 51/02

OTHER PUBLICATIONS

Unkown, "Orchestrating Multiple Bots with Multilingual Support—Developer Blog", 9 pages, printed from <https://www.microsoft.com/developerblog/2017/01/21/orchestrating-multiple-bots-with-multilingual-support/> on May 8, 2019.
Mell et al., "The NIST Definition of Cloud Computing," National Institute of Standards and Technology, NIST Special Publication 800-145, Sep. 2011, 7 pages.

* cited by examiner

| Data Model | Data Objects | | | | |
|---|---|---|---|---|---|
| User Profile | User Name | Telephone No | Email Address | Gender | Birthday |
| | Louis Huang | 6907 | | | |

CHATBOT INFORMATION PROCESSING

BACKGROUND

The present invention relates to chatbots, and more specifically, to chatbot information processing.

With the rapid development of AI technology, chatbots are used widely nowadays. Generally, chatbots are created and used based on industry domains. However multiple interfaces of multiple chatbots may create complexity to end users. Furthermore, the end users may be bothered to provide same information repeatedly when interacting with those chatbots.

SUMMARY

According to one embodiment of the present invention, there is provided a computer-implemented method. According to the method, chat information of a chatbot is obtained in response to receiving one or more chat messages from the chatbot. Then a matching data object of a matching data model from one or more data models is determined based on the chat information. And a data value of the matching data object is obtained as a response to the one or more chat messages.

Further, computer program products and systems are also provided according to embodiments of the present invention.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

Throughout the drawings, the same or similar reference numerals represent the same or similar elements.

DETAILED DESCRIPTION

Figure 1:
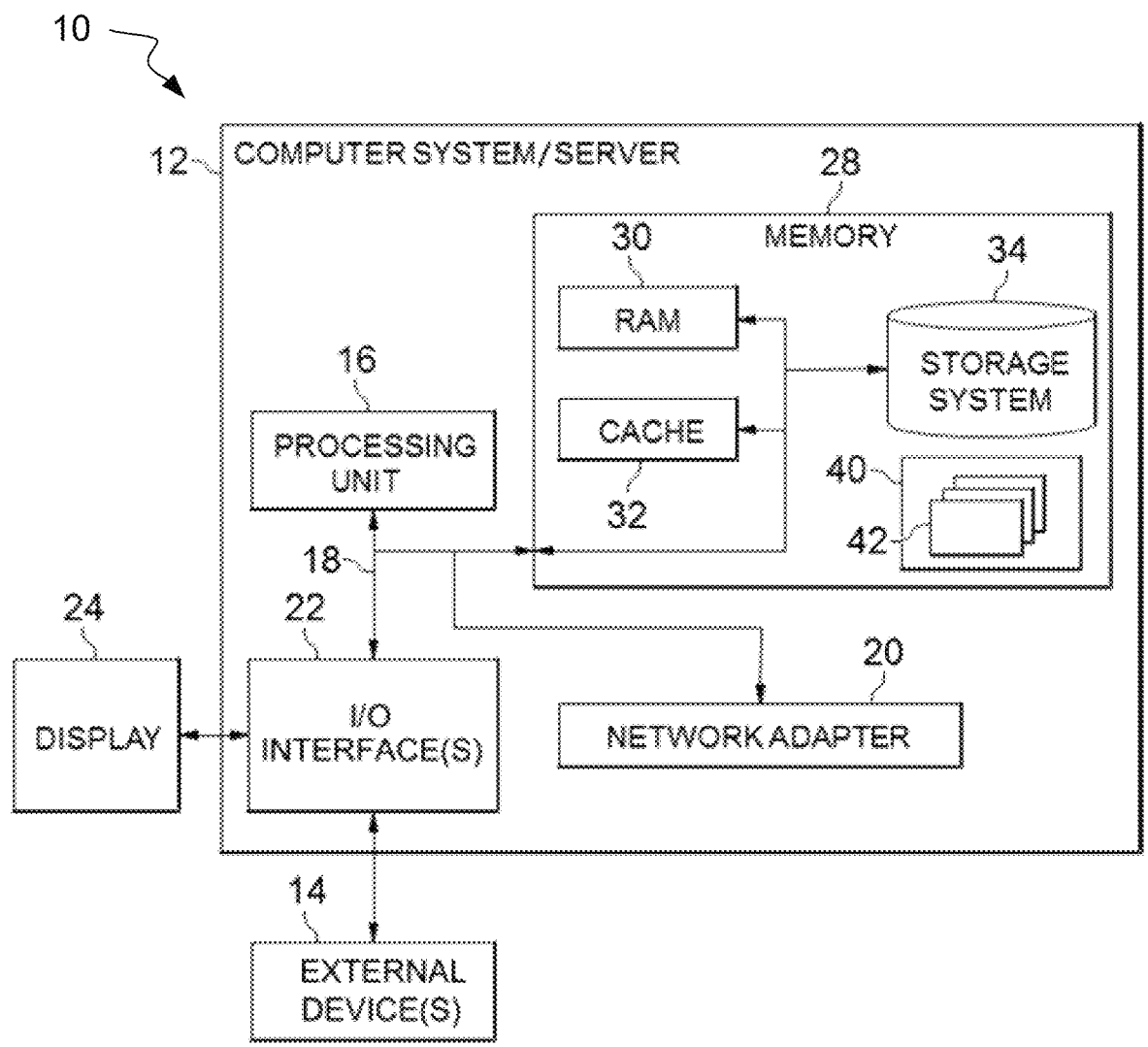
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components may be used in conjunction with computer system/server 12. Examples, include, but are not limited to: microcode, device drivers, redundant processing units, external disk drive arrays, RAID systems, tape drives, and data archival storage systems, etc.

Figure 2:
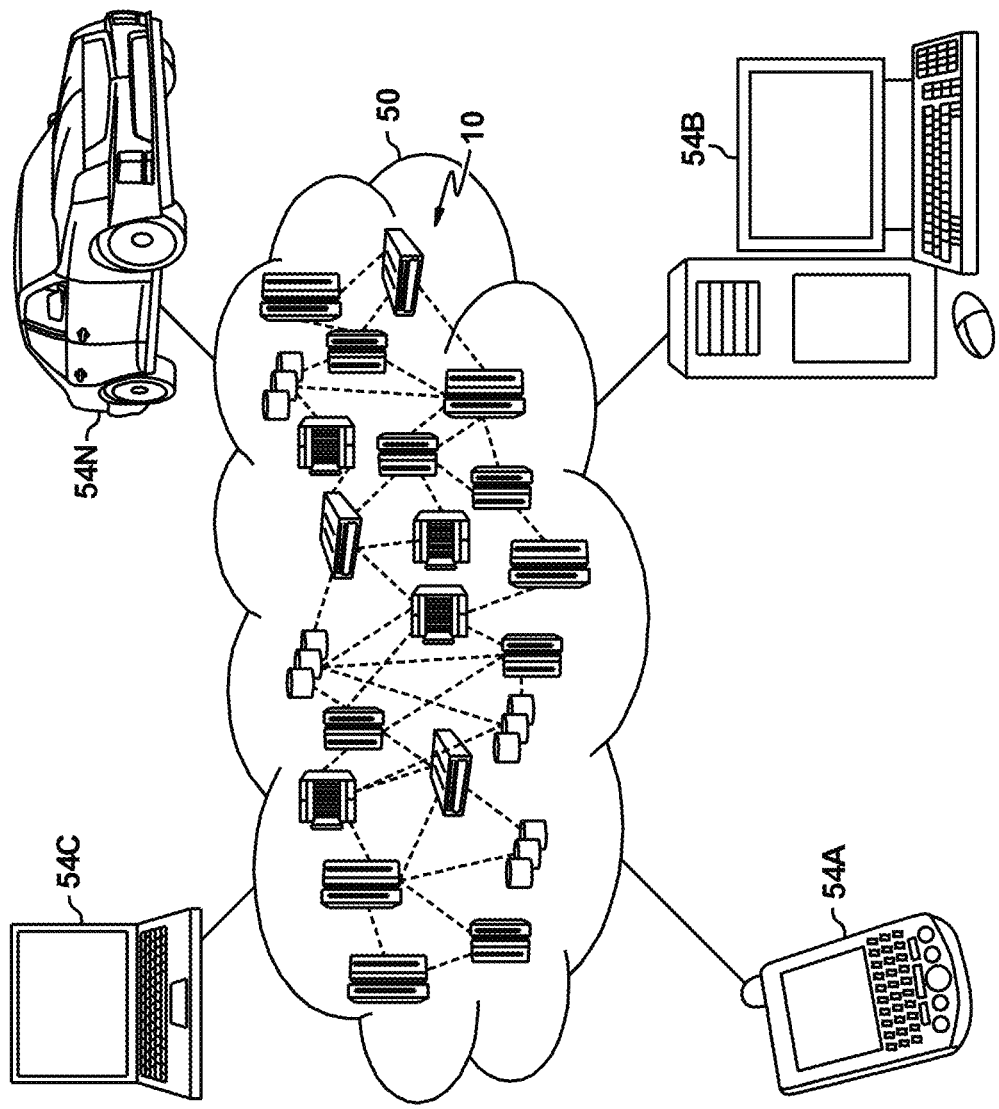
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
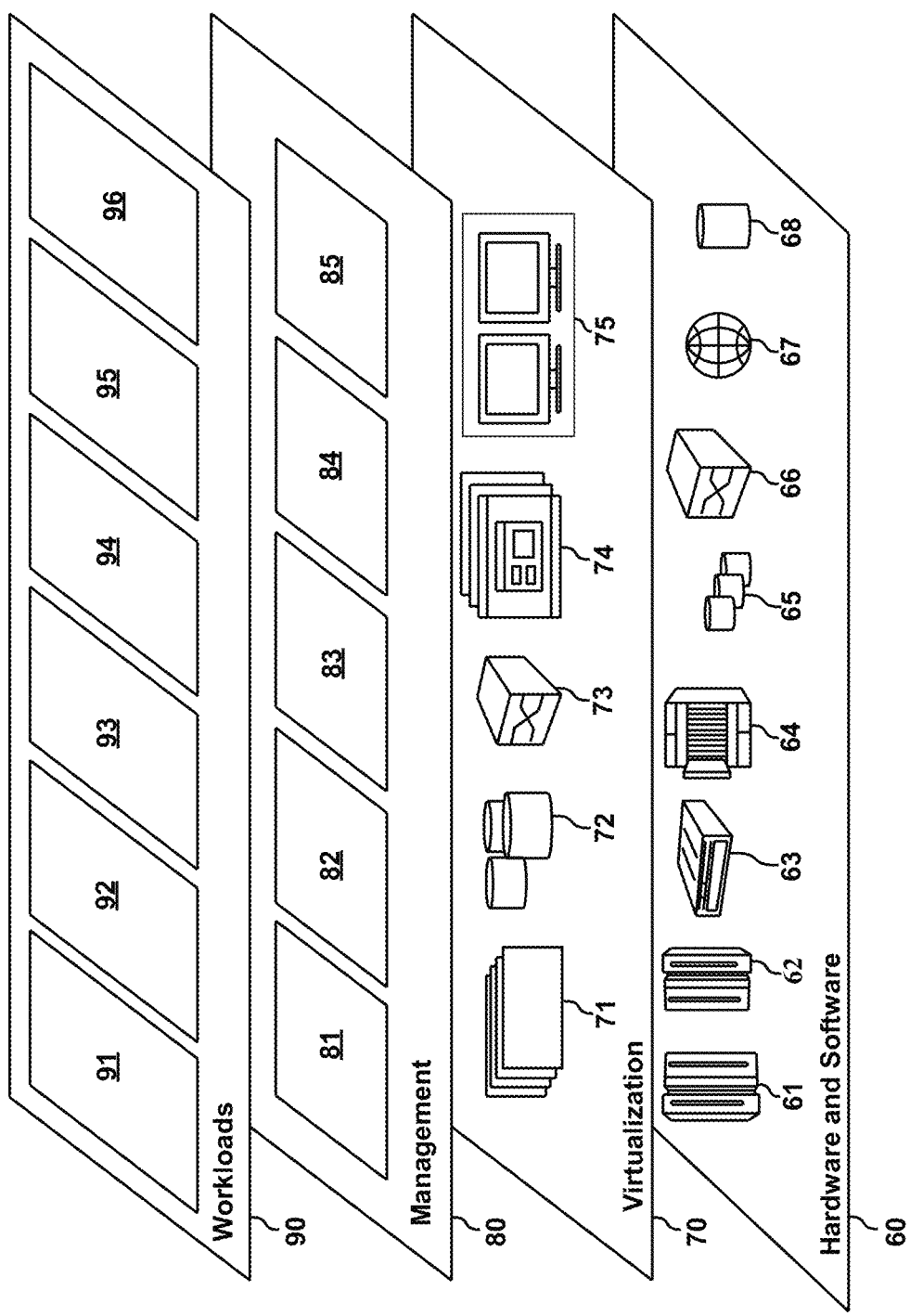
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chatbot information processing 96.

With the rapid development of information technology, especially artificial intelligence technology, chat robots (also referred to as to "chatbot" hereinafter) are widely used in various services, for example, the customer service area. Usually, different chatbots are used in different areas and, as such, the user needs to repeat the same or similar content in response to different chatbots. This brings much repetitive work to the user and also results in bad user experience.

Existing solutions leverage an integration service layer to store the context and require the chatbot to be aware of the existence of the integration service layer. These solutions need explicit changes in chatbot implementation to include the retrieval of shared context in the application logic, through ways such as RESTful APIs calls (RESTful API is an application program interface (API) based on representational state transfer (REST) technology), or following a pre-defined framework. An easier way than these existing solutions is needed.

Figure 4:
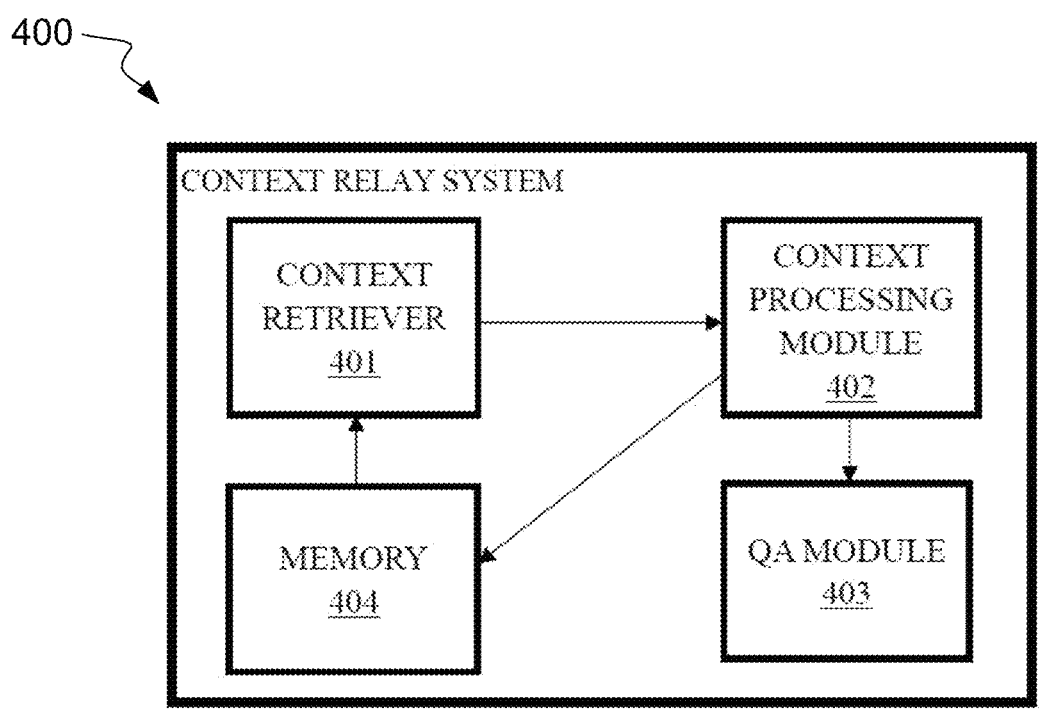
FIG. 4 shows an example of a context relay system according to an embodiment of the present invention.

Referring now to FIG. 4, an example of a context relay system 400 is shown according to an embodiment of the present invention. It is to be understood by those skilled in the art that all or any part of the context relay system 400 may be an independent unit or a part of a user's computing device.

As shown in FIG. 4, the context relay system 400 comprises a context retriever 401, a context processing module 402, a question answering (QA) module 403, and a memory 404. In one embodiment, one or more pre-defined data models are stored in the memory 404. In another embodiment, context retriever 401 may retrieve the chat history of the one or more chatbots, and then send it to context processing module 402. In a further embodiment, context processing module 402 analyzes the context of the chat history to extract corresponding data to input into one or more data objects of the data models. In another embodiment, context retriever 401 may receive one or more chat messages of current chatbot and then send the one or more chat messages to context processing module 402. Context processing module 402 may analyze the chat messages of the current chatbot and/or a domain of the current chatbot to choose a proper data model to be used to interact with the chatbot on behalf of the user. Usually a chatbot is responsible for a function area. Flight service and hotel service are two examples of function areas. As such, the domain of the two chatbots may be assigned as "Flight Service" and "Hotel Service" respectively. The relationship between each domain and one or more data models may be pre-determined and saved, for example as a mapping table, into memory 404. In an embodiment, a domain may correspond to one or more data models. In a further embodiment, a data model may correspond to one or more domains. In some embodiments, a matching data object of the data model may be further determined. The data value of the matching data object obtained by context processing module 402 may be sent to QA module 403 as a response. In a further embodiment, QA module 403 may interact with the chatbot on behalf of the user. Those skilled in the art will appreciate that context retriever 401, context processing module 402, and QA module 403 may be separate components or one or more components with the function described above and hereinafter. The details will be described below with reference to FIG. 5-FIG. 8.

Figure 5:
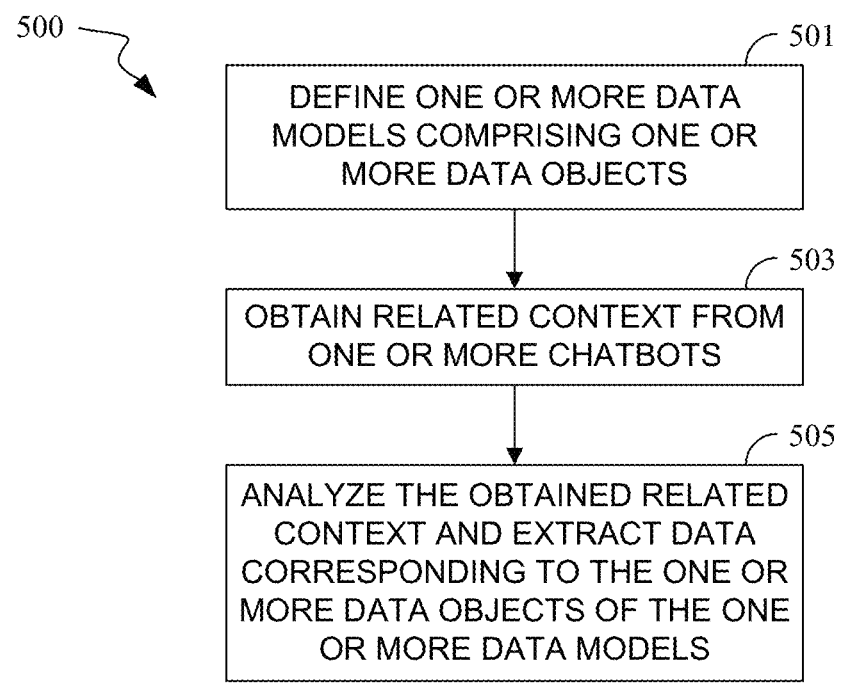
FIG. 5 shows a flowchart of a method for generating a data model in accordance with embodiments of the present disclosure.

Reference is now made to FIG. 5, which shows a flowchart of a method 500 for generating a data model in accordance with embodiments of the present disclosure. The method 500 starts at operation 501, in which one or more data models are defined. In some embodiments, the one or more data models may be defined at least based on a function area. In a further embodiment, for the function area as "Hotel Service", data models such as "User Profile" and "Member Card" may be defined. And the relationship between the domain of the chatbot "Hotel Service" and the two data models "User Profile" and "Member Card" may be recorded in memory 404. In a further embodiment, one or more data objects may be set to each one of the data models. In some embodiments, the data objects may be defined based on corresponding function areas. In another embodiment, the defined data models may be stored on memory 404. Table 1 below shows two examples of data models (i.e., data_model_1 and data_model_2), wherein data_model_1 is "User Profile" comprising data objects "User Name", "Telephone No.", "Email Address", "Gender", "Birthday"; and data_model_2 is "Member Card" comprising data objects "User Name", "Member Card No.", "Expire Date". It should be understood by those skilled in the art that Table 1 only shows data_model_1 and data_model_2 as examples. Data models may be defined in other ways on demand.

TABLE 1

| Data Model | Data Objects |
| --- | --- |
| User Profile | User Name, Telephone No., Email Address, Gender, Birthday |
| Member Card | User Name, Member Card No., Expire Date |

Then the method goes to operation 503, in which related context is obtained. In some embodiments, the related context is obtained from historical or current chat record between the user and current chatbot or other chatbots. For example, when the user terminates chat with the current chatbot, the context retriever 401 may retrieve the latest unprocessed chat history as the related context.

Then in operation 505, the context retriever 401 sends the obtained related context to the context processing module 402 which may analyze the obtained related context and extract data corresponding to the data objects of the data model as a data value of respective objects. Any existing technologies, either currently known or to be developed in future, such as IBM Watson® Natural Language Classifier, Natural Language Understanding API, etc., may be used to analyze the retrieved unprocessed chat history and extract corresponding data. "IBM" and "IBM Watson" are registered trademarks of International Business Machines Corporation ("IBM") in the United States. "Watson" is a trademark or common law mark of IBM in the United States.

In this way, the data values of the data objects of the data model may be determined and used in the future chat with chatbots. In further embodiments, the data values may be updated based on the newest chat history.

Figures 7A, 7B:
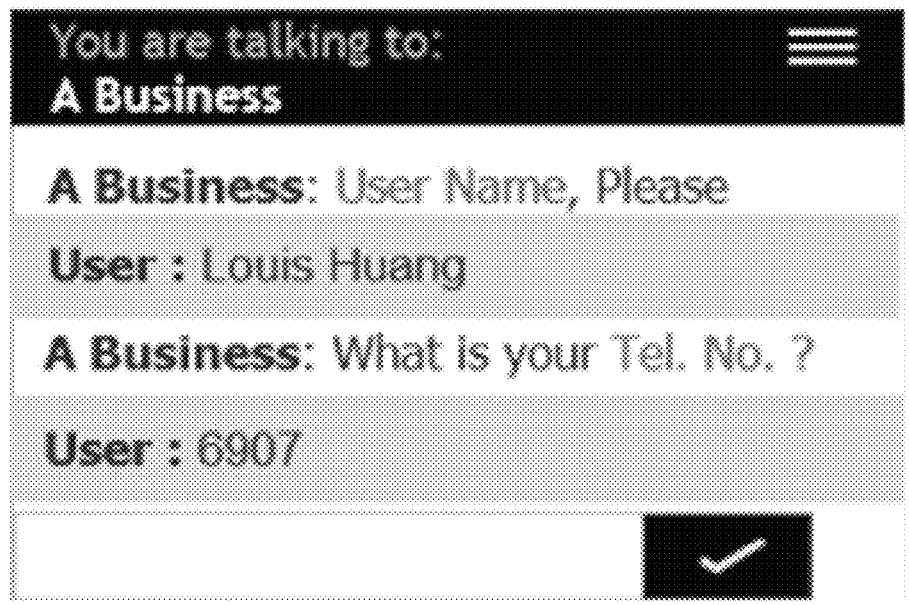
FIG. 7A shows an example of an unprocessed chat history with a chatbot in accordance with embodiments of the present disclosure.
FIG. 7B shows an example of a data model in accordance with embodiments of the present disclosure.

Reference is now made to FIG. 7A, in which an example of unprocessed chat history with a chatbot is shown in accordance with embodiments of the present disclosure. In some embodiments, one or more domains might be assigned to the chatbot. In the example shown in FIG. 7A, the domain of the chatbot is set as "Hotel Service". With reference back to FIG. 5, the unprocessed chat history as shown on FIG. 7A is retrieved by context retriever 401 in operation 503. Then in operation 505, the context retriever 401 sends the retrieved related context, i.e. the unprocessed chat history, to context processing module 402 for analysis. In a further embodiment, context processing module 402 may extract and input data corresponding to the data objects of the data model. In some embodiments, one or more data models corresponding to the unprocessed chat history may be determined first. In some embodiments, the one or more data models may be determined based on the domain of the chatbot and/or the related context. Any suitable technology, either currently known or to be developed in future, such as IBM Watson® Natural Language Classifier, Natural Language Understanding API, etc., may be employed to utilize the related context to determine the corresponding data model. In an embodiment, the data model is determined to be "User Profile" shown in FIG. 7B for the example shown in FIG. 7A. In some further embodiments, the obtained related context may be analyzed by the context processing module 402. In some embodiments, the data for corresponding data objects "User Name", "Telephone No." may be extracted from the context as shown on FIG. 7A and then inserted into the data model "User Profile" by the context processing module 402 as shown on FIG. 7B. Any existing technologies, either currently known or to be developed in future, such as IBM Watson® Natural Language Classifier, Natural Language Understanding API, etc., may be used here.

By the method described above, the data model(s) may be defined, inputted and updated based on the chat history between the user and different chatbots. And then the data model may be used in the future chat between the user and different kinds of chatbot as described with reference to FIG. 6 below.

Figure 6:
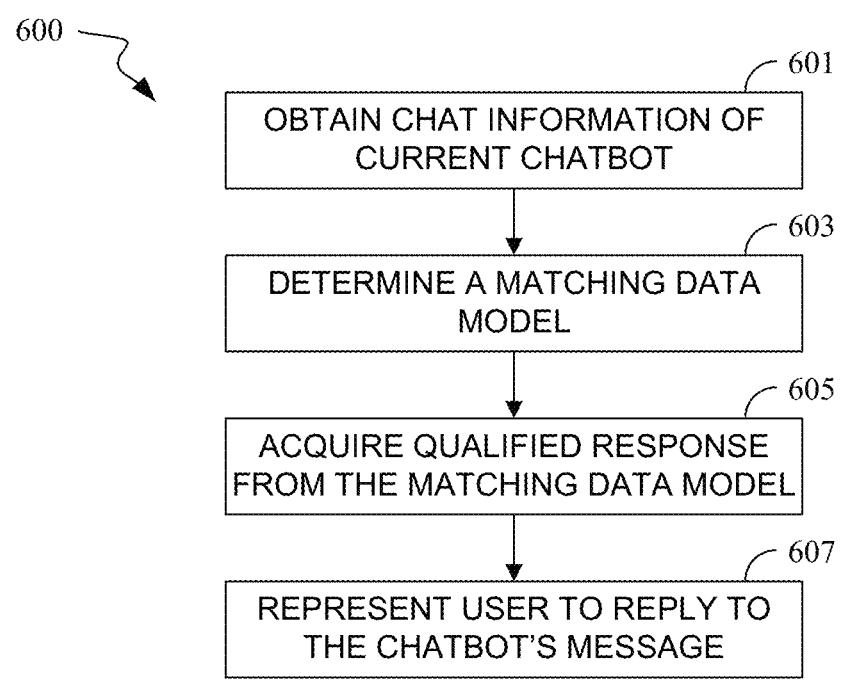
FIG. 6 shows a flowchart of a method for generating a response based on the data model in accordance with embodiments of the present disclosure.

Reference is now made to FIG. 6, which shows a flowchart of a method 600 for generating response to a chatbot based on the data object(s) of the pre-defined data model in accordance with embodiments of the present disclosure.

Method 600 starts at operation 601, in which chat information of a current chatbot is obtained by the context retriever 401 in response to receiving one or more chat messages from the chatbot. In an embodiment, the chat information comprises at least one of: the chat context of the current chatbot and the domain of the current chatbot. Then the method goes to operation 603, in which a matching data model may be determined by the context processing module 402 based on the chat information obtained in operation 601. In operation 603, the context processing module 402 receives the chat context of the current chatbot from the context retriever 401. And then, the context processing module 402 analyzes the context to determine a matching data model. In a further embodiment, one or more matching data objects of the matching data model may be determined. Any existing technologies, either currently known or to be developed in future, such as IBM Watson® Natural Language Classifier, Natural Language Understanding, etc., may be used here. In a further embodiment, the domain of the chatbot may be used to determine the matching data model in lieu of, or in addition to, the chat context of the current chatbot.

Then in operation 605, context processing module 402 may acquire the data value of the matching object of the matching data model as a response for the chat message raised by the current chatbot. Then the method 600 goes to operation 607 in which the QA module 403 may represent the user to reply the chatbot's message. In a further embodiment, the context processing module 402 may send the qualified response to QA module 403 before the QA module 403 sends the response. In one embodiment, the obtained response may be sent to the chatbot directly. In another embodiment, the user may review the response to check if the response is correct before sending the response. The obtained data value may be shown to the user instead of being sent to the chatbot directly, and the response may be sent to the chatbot after the user confirms the response is correct. In a further embodiment, the user may input a correct response if the current response is incorrect.

In yet another embodiment, the context processing module 402 may record the dialog which is generated by using this method into memory 404. In a further embodiment, the input from QA module 403 may be identified. In yet another embodiment, the previous dialog may be reviewed to check if the input from QA module 403 is correct. In some embodiments, the context processing module 402 monitors a rollback process. In a further embodiment, in response to the input from QA module 403 being incorrect, the context processing module 402 may roll back the chat to the point of incorrect response and continue the chat with corrected response. In a further embodiment, the corrected response may be obtained by the context retriever 401 to refine the related data model.

Figure 8:
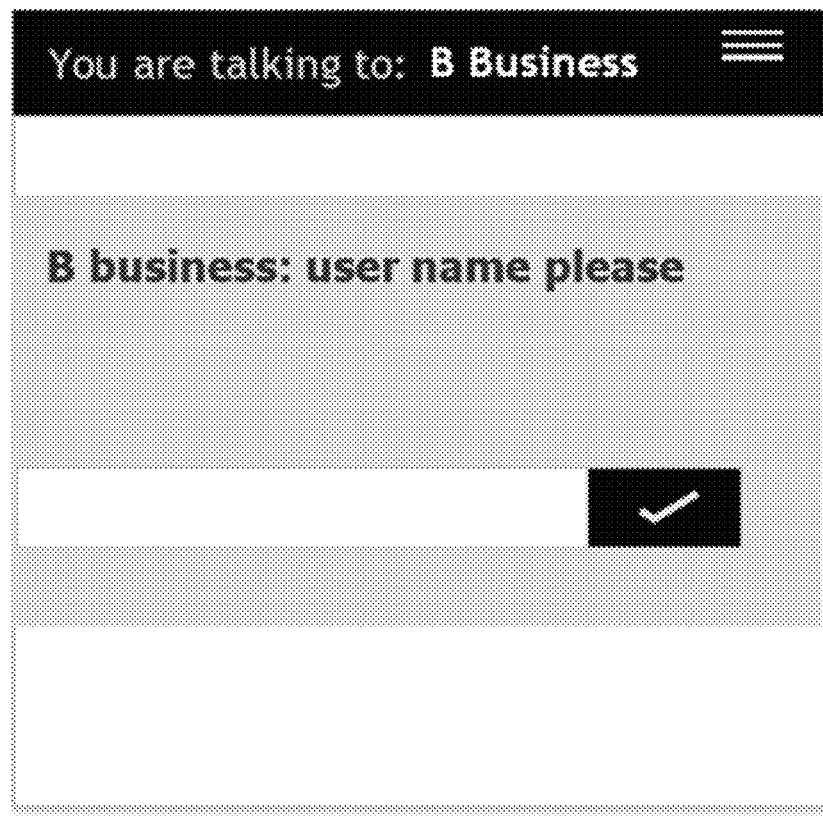
FIG. 8 shows an example of an interface of a chat with a current chatbot in accordance with embodiments of the present disclosure.

Reference is now made to FIG. 8, in which an example of an interface for chatting with a current chatbot is shown in accordance with an embodiment of the present disclosure. In some embodiments, one or more domains may be pre-assigned to the chatbot. In the example shown on FIG. 8, the domain of the chatbot is set as "Hotel Service".

Now referring back to FIG. 6, in operation 601, the chat information including chat context of current chatbot as shown on FIG. 8 is obtained by the context retriever 401. Then the method goes to operation 603, in which a matching data model may be determined by the context processing module 402 based on the chat information obtained in operation 601. In this example, the corresponding domain is "Hotel Service" which may be used to determine a matching data model, especially when there is not enough context information. In another embodiment, the chat context "B business: user name please" may be used alone or with the domain "Hotel Service" to determine the matching data model. In a further embodiment, the matching data model is determined as "User Profile" as shown on FIG. 7B. In the example as shown in FIG. 8 and FIG. 7B, the data object corresponding to the message is determined as "User name". Any existing technologies, either currently known or to be developed in future, such as IBM Watson® Natural Language Classifier, Natural Language Understanding API, etc., may be used here.

In some embodiments, a data model may be corresponding to one or more domains of chatbots, and a domain may be corresponding to one or more data models too. As such, although in the embodiments above, the domain of current chatbot "Hotel Service" is the same as the domain of previous chatbot that is used to input the data of the data model, the domain of current chatbot may be different from the domain of previous chatbot too as long as both domains refer to a same data model.

Then in operation 605, context processing module 402 may acquire a qualified response from a data object of the matching data model for the message "user name please" raised by the current chatbot. In a further embodiment, the data value "Louis" corresponding to data object "User Name" as shown on FIG. 7B is obtained as a qualified response. Then the method 600 goes to operation 607 in which the QA module 403 may represent the user to respond to the chatbot's message. In a further embodiment, the context processing module 402 may send the qualified response to QA module 403 before the QA module 403 sends the response.

In one embodiment, the obtained data may be sent to the chatbot by the QA module 403 directly. In another embodiment, the user may review the response to be sent to check if the response is correct before sending the response. In a further embodiment, the user may input a correct response if the current response is considered as incorrect.

In yet another embodiment, the context processing module 402 may record the dialog which is generated by using this method into memory 404. In a further embodiment, the input from QA module 403 may be identified. In yet another embodiment, the user may review the previous dialog to check if the input from QA module 403 is correct.

In some embodiments, the context processing module 402 monitors the rollback process. In a further embodiment, in response to the input from QA module 403 being incorrect, the context processing module 402 may roll back the chat to the point of incorrect response and continue the chat with corrected response. In a further embodiment, the corrected response inputted by the user may be obtained by the context retriever 401 to refine the related data model.

By the method as described as above, no changes to current chatbots' existing logics are required to adopt this method. The system does not require a prior knowledge of all the chatbots that may be involved. The agent and the chatbots are loosely coupled.

It should be noted that the processing of multiple chatbots collaboration according to embodiments of this disclosure may be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to a person skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by one or more processing units of a context relay system at least a portion of which is part of a user's computing device, one or more chat messages from a chatbot requesting a user input;
   obtaining, by one or more processing units of the context relay system, chat information of the chatbot in response to receiving the one or more chat messages from the chatbot, wherein the chat information comprises at least one of: a chat context of the chatbot, a domain of the chatbot;

determining, by one or more processing units of the context relay system, a matching data object of a matching data model from one or more data models based on the chat information, wherein the determining, by one or more processing units of the context relay system, the matching data object of the matching data model from the one or more data models based on the chat information includes analyzing the chat context of the chatbot and/or the domain of the chatbot to determine the matching data model and the matching data object thereof, wherein each of the one or more data models comprises at least one pre-defined data object, and a data value of the at least one pre-defined data object is determined at least based on one or more chat histories with at least one chatbot of one or more chatbots;

obtaining, by one or more processing units of the context relay system, the data value of the matching data object as a response to receiving the one or more chat messages from the chatbot;

sending, by one or more processing units of the context relay system, the data value of the matching data object to the chatbot as the response to receiving the one or more chat messages from the chatbot.

2. The computer-implemented method according to claim 1, wherein the domain is pre-assigned to the chatbot.

3. The computer-implemented method according to claim 1, wherein the sending, by one or more processing units of the context relay system, the data value of the matching data object to the chatbot as the response to receiving the one or more chat messages from the chatbot further comprising:

sending, by one or more processing units of the context relay system, the response in response to receiving a confirmation of the response from a user.

4. The computer-implemented method according to claim 1, further comprising:

receiving, by one or more processing units of the context relay system, an instruction indicating the response as incorrect;

replacing, by one or more processing units of the context relay system, the response with a corrected response.

5. The computer-implemented method according to claim 1, wherein the receiving, by one or more processing units of the context relay system, one or more chat messages from a chatbot requesting a user input, the obtaining, by one or more processing units of the context relay system, chat information of the chatbot in response to receiving the one or more chat messages from the chatbot, the determining, by one or more processing units of the context relay system, a matching data object of a matching data model from one or more data models based on the chat information, the obtaining, by one or more processing units of the context relay system, a data value of the matching data object as a response to receiving the one or more chat messages from the chatbot, and the sending, by one or more processing units of the context relay system, the data value of the matching data object as the response to receiving the one or more chat messages from the chatbot together comprise a response generation operation, the computer-implemented method, prior to the response generation operation, further comprising:

defining, by one or more processing units of the context relay system, the one or more data models each comprising the at least one pre-defined data object;

obtaining, by one or more processing units of the context relay system, related context from the one or more chatbots, wherein the obtained related context includes one or more chat histories with the at least one chatbot of the one or more chatbots, analyzing, by one or more processing units of the context relay system, the related obtained context and extracting data corresponding to the at least one pre-defined data objects of the one or more data models.

6. A computer system, comprising:

a processor; a computer-readable memory coupled to the processor, the memory comprising instructions that when executed by the processor perform actions of:

receiving, by one or more processing units of a context relay system at least a portion of which is part of a user's computing device, one or more chat messages from a chatbot requesting a user input;

obtaining, by one or more processing units of the context relay system, chat information of the chatbot in response to receiving the one or more chat messages from the chatbot, wherein the chat information comprises at least one of: a chat context of the chatbot, a domain of the chatbot;

determining, by one or more processing units of the context relay system, a matching data object of a matching data model from one or more data models based on the chat information, wherein the determining, by one or more processing units of the context relay system, the matching data object of the matching data model from the one or more data models based on the chat information includes analyzing the chat context of the chatbot and/or the domain of the chatbot to determine the matching data model and the matching data object thereof, wherein each of the one or more data models comprises at least one pre-defined data object, and a data value of the at least one pre-defined data object is determined at least based on one or more chat histories with at least one chatbot of one or more chatbots;

obtaining, by one or more processing units of the context relay system, the data value of the matching data object as a response to receiving the one or more chat messages from the chatbot;

sending, by one or more processing units of the context relay system, the data value of the matching data object to the chatbot as the response to receiving the one or more chat messages from the chatbot.

7. The computer system according to claim 6, wherein the domain is pre-assigned to the chatbot.

8. The computer system according to claim 6, wherein the sending, by one or more processing units of the context relay system, the data value of the matching data object to the chatbot as the response to receiving the one or more chat messages from the chatbot further comprising:

sending, by one or more processing units of the context relay system, the response in response to receiving a confirmation of the response from a user.

9. The computer system according to claim 6, further comprising:

receiving, by one or more processing units of the context relay system, an instruction indicating the response as incorrect;

replacing, by one or more processing units of the context relay system, the response with a corrected response.

10. The computer system according to claim 6, wherein the receiving, by one or more processing units of the context relay system, one or more chat messages from a chatbot requesting a user input, the obtaining, by one or more processing units of the context relay system, chat information of the chatbot in response to receiving the one or more chat messages from the chatbot, the determining, by one or more processing units of the context relay system, a matching data object of a matching data model from one or more data models based on the chat information, the obtaining, by one or more processing units of the context relay system, a data value of the matching data object as a response to receiving the one or more chat messages from the chatbot, and the sending, by one or more processing units of the context relay system, the data value of the matching data object as the response to receiving the one or more chat messages from the chatbot together comprise a response generation operation, and wherein the memory further comprises instructions that when executed by the processor perform further actions, prior to the response generation operation, of:

defining, by one or more processing units of the context relay system, the one or more data models each comprising the at least one pre-defined data object;

obtaining, by one or more processing units of the context relay system, related context from the one or more chatbots, wherein the obtained related context includes one or more chat histories with the at least one chatbot of the one or more chatbots, analyzing, by one or more processing units of the context relay system, the related obtained context and extracting data corresponding to the at least one pre-defined data objects of the one or more data models.

11. A computer program product comprising: a computer readable storage medium having a computer readable program stored therein, wherein the computer readable program, when executed by one or more processing units of a context relay system at least a portion of which is part of a user's computing device, causes the context relay system to:

receive one or more chat messages from a chatbot requesting a user input;

obtain chat information of the chatbot in response to receiving the one or more chat messages from the chatbot, wherein the chat information comprises at least one of: a chat context of the chatbot, a domain of the chatbot;

determine a matching data object of a matching data model from one or more data models based on the chat information, wherein the determine the matching data object of the matching data model from the one or more data models based on the chat information includes analyzing the chat context of the chatbot and/or the domain of the chatbot to determine the matching data model and the matching data object thereof, wherein each of the one or more data models comprises at least one pre-defined data object, and a data value of the at least one pre-defined data object is determined at least based on one or more chat histories with at least one chatbot of one or more chatbots;

obtain the data value of the matching data object as a response to receiving the one or more chat messages from the chatbot;

send the data value of the matching data object to the chatbot as the response to receiving the one or more chat messages from the chatbot.

12. The computer program product according to claim 11, wherein the domain is pre-assigned to the chatbot.

13. The computer program product according to claim 11, wherein the send the data value of the matching data object to the chatbot as the response to receiving the one or more chat messages from the chatbot further comprising:

send the response in response to receiving a confirmation of the response from a user.

14. The computer program product according to claim 11, wherein the receive one or more chat messages from a chatbot requesting a user input, the obtain chat information of the chatbot in response to receiving the one or more chat messages from the chatbot, the determine a matching data object of a matching data model from one or more data models based on the chat information, the obtain a data value of the matching data object as a response to receiving the one or more chat messages from the chatbot, and the send the data value of the matching data object to the chatbot as the response to receiving the one or more chat messages from the chatbot together comprise a response generation operation, and wherein the computer readable program, when executed by one or more processing units of the context relay system, further causes the context relay system, prior to the response generation operation, to:

define the one or more data models each comprising the at least one pre-defined data object;

obtain related context from the one or more chatbots, wherein the obtained related context includes one or more chat histories with the at least one chatbot of the one or more chatbots, analyze the related obtained context and extract data corresponding to the at least one pre-defined data objects of the one or more data models.

\* \* \* \* \*